S. B. MAULSBY.
Evaporator.
No. 53,318. Patented March 20, 1866.
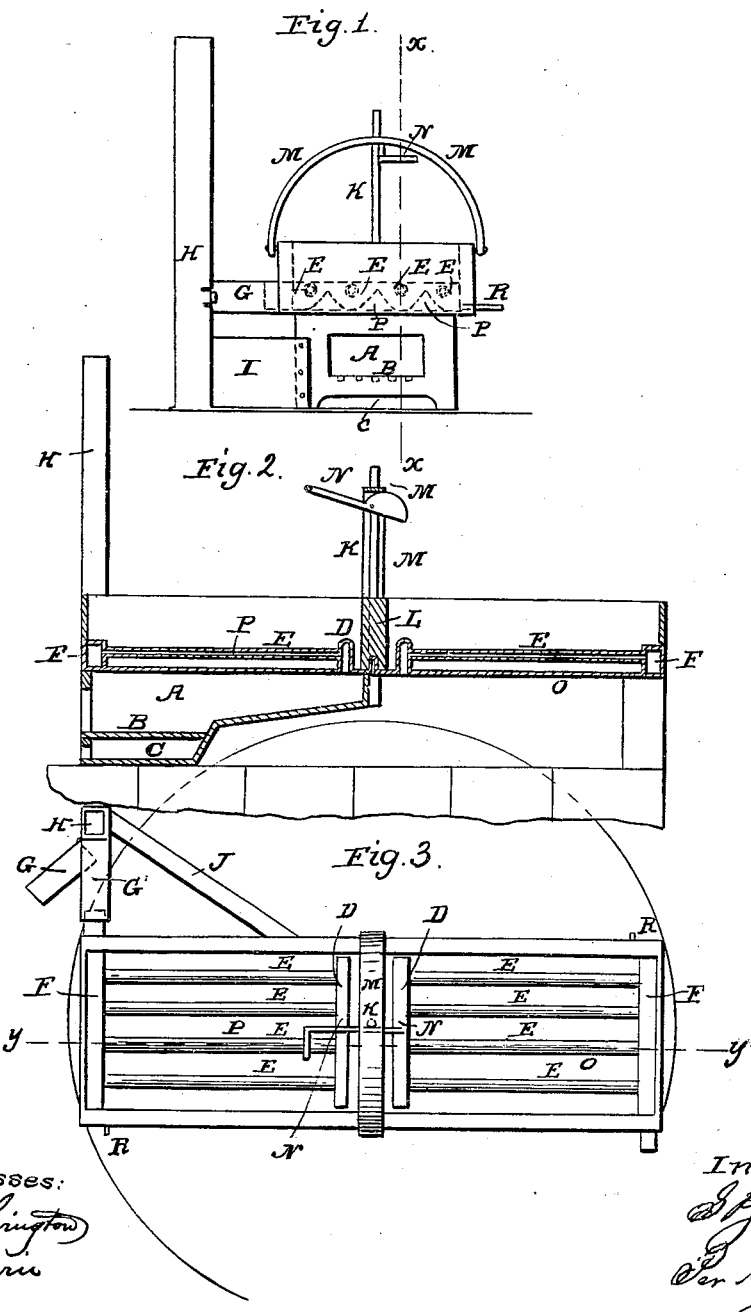

UNITED STATES PATENT OFFICE.

SILAS B. MAULSBY, OF MUNCIE, INDIANA.

IMPROVED EVAPORATOR.

Specification forming part of Letters Patent No. 53,318, dated March 20, 1866.

*To all whom it may concern:*

Be it known that I, SILAS B. MAULSBY, of Muncie, Delaware county, State of Indiana, have made a new and useful Improvement in Evaporators; and I do hereby declare that the following is a full, clear, and exact description thereof, which will enable others skilled in the art to make and use the same, reference being had to the accompanying drawings, forming part of this specification, in which—

Figure 1 is a front end view of my improved evaporator. Fig. 2 is a vertical longitudinal section through the line $x\,x$, Fig. 1, and $y\,y$, Fig. 3. Fig. 3 is a top or plan view of my improved evaporator.

Similar letters of reference indicate like parts.

My invention is designed to furnish an evaporator by which sap or cane-juice may be rapidly evaporated with an economical use of fuel; and it consists, first, of the combination of a revolving pan with a portable furnace; second, in the combination of the smoke and heat flues with the pan and furnace; third, in the combination of the fluted bottom with the pan and with the furnace; fourth, in the combination of the cam-lever with the pan and with the vertical shaft about which the pan revolves; and, fifth, the combination of the hinged horizontal pipe with the pan and smoke-stack, as hereinafter more fully described.

A is the fire-chamber, B the grate, and C the ash-pit, of a portable furnace. The door may be in the front of the furnace or in the end, or both, as may be convenient. The fire-chamber extends back, as represented in Fig. 2, so that the whole bottom of that part of the pan in which evaporation may be going on may be exposed to the direct heat of the fire.

D is a recess extending up into the back part of the pan, as shown, from which the flues E lead. The flues E pass longitudinally through the pan near its bottom, and all lead into a flue, F, which passes across the bottom of the pan at its front end, and through the side of said pan, to connect with the hinged horizontal pipe G, as shown in Figs. 1 and 2. The pipe G is hinged to the side of the smoke-stack H, so that it may be moved out of the way of the pan, as shown in red in Fig. 3, when said pan is revolved. When the other end of the pan has been brought into its place the pipe G is swung back into its place and again connected with the flue F.

I and J are braces to sustain the smoke-stack in its position. The pan revolves around a vertical shaft, K, which passes down through the center of the partition E, which divides the pan into two equal parts, and its lower end is supported by the rear end of the furnace, or by some other convenient support.

M is a bail or band attached to the sides of the pan, as shown, and of sufficient strength to sustain the weight of the pan and its contents. The shaft K passes through the middle of this bail, as shown in Figs. 1 and 3.

N is a cam-lever pivoted to the shaft K in such a position that when the long arm of the lever is raised the forward end of the pan may rest upon the top of the furnace; but when the long arm of the lever is lowered the pan and its contents are sustained by the lever, and while in this position the pan may be revolved, as indicated by the red circle in Fig. 3. The bottom of the pan may be nearly level, or flat, as shown at O, Figs. 2 and 3; but I prefer to make it fluted, as represented at P in Figs. 1, 2, and 3, the flues E passing longitudinally through, or a little above, the depressions formed in the upper surface of the bottom P, as shown in Fig. 1.

By fluting the bottom P of the pan I expose a greater surface of said bottom to the direct heat of the fire, and thus greatly increase the rapidity of the evaporation.

The bottom and the channels of the bottom O and P are made to incline slightly toward the discharge-pipes B, one of which is placed at the lowest point of the bottom of each compartment of the pan, so that the sirup or molasses may be conveniently drawn from the pan when desired.

It will be observed that the bottom of the pan forms the top of the furnace, thus economizing the heat to the greatest possible extent.

I claim as new and desire to secure by Letters Patent—

1. The combination of a revolving pan with a portable furnace, substantially as described, and for the purpose set forth.

2. The combination of the smoke and heat flues E with the pan and furnace, substantially as described, and for the purpose set forth.

3. The combination of the fluted bottom P with the pan and with the furnace, substantially as described, and for the purpose set forth.

4. The combination of the cam-lever N with the pan and with the vertical shaft, substantially as described, and for the purpose set forth.

5. The combination of the hinged horizontal pipe G with pan and smoke-stack, substantially as described, and for the purpose set forth.

SILAS B. MAULSBY.

Witnesses:
GEO. W. FAY,
CY. G. NEELY.